A. T. PARKER.
GAGE.
APPLICATION FILED JUNE 9, 1919.
1,359,834.
Patented Nov. 23, 1920.
2 SHEETS—SHEET 2.
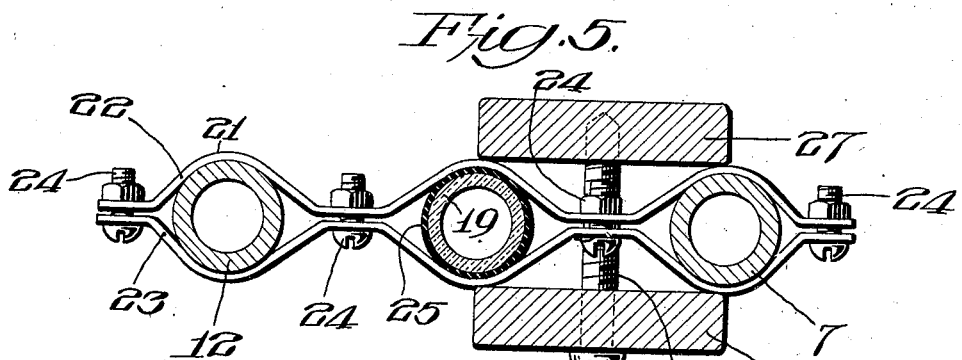
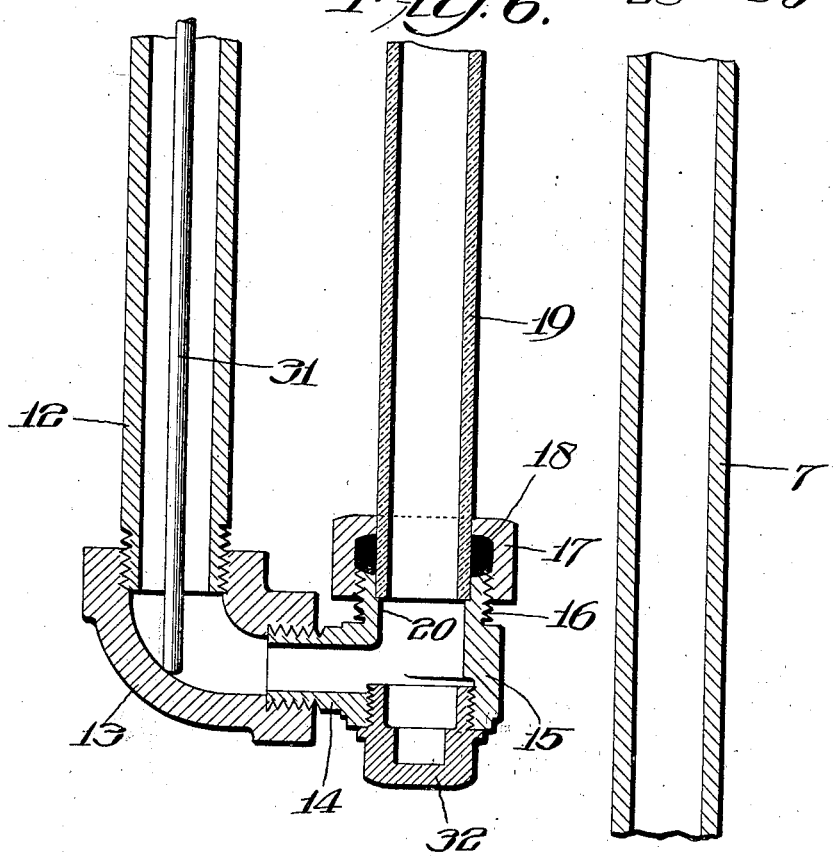
Witnesses:
R. H. Fanvil
Augustus B. Copper
Inventor
Asa T. Parker,
By Joshua R. H. Toth
his Attorney

UNITED STATES PATENT OFFICE.

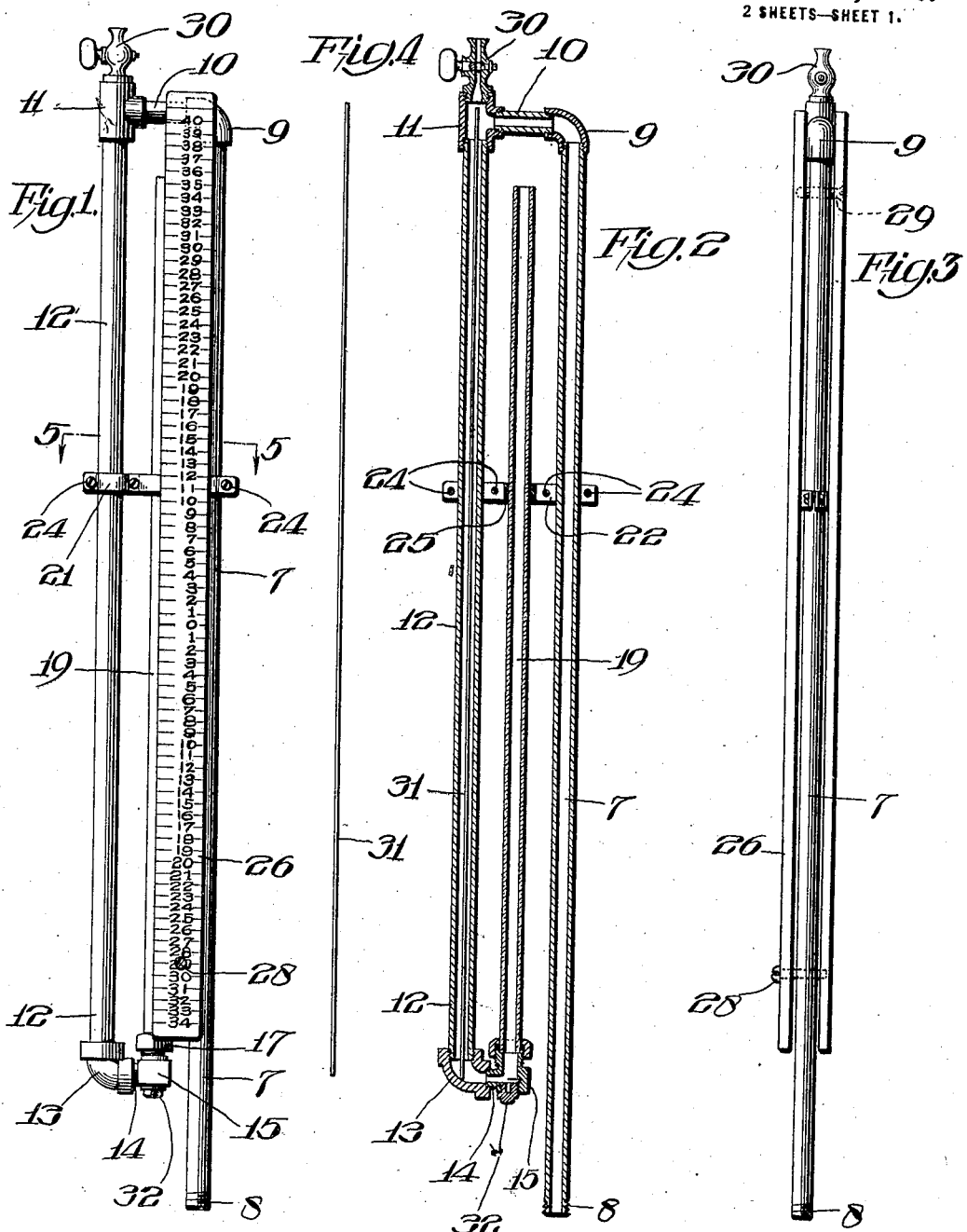

ASA T. PARKER, OF PHILADELPHIA, PENNSYLVANIA.

GAGE.

1,359,834.

Specification of Letters Patent.  Patented Nov. 23, 1920.

Application filed June 9, 1919. Serial No. 302,646.

*To all whom it may concern:*

Be it known that I, ASA T. PARKER, a citizen of the United States, residing at Philadelphia, in the county of Philadelphia and State of Pennsylvania, have invented certain new and useful Improvements in Gages, of which the following is a specification.

One object of my invention is to provide an improved gage which will be particularly suitable for use in connection with gas works for determining pressure or partial vacuum, and which will be so constructed that the same can be read upon a single scale or graduated member instead of reading upon two elements, such for example as now in common use, said elements including two glass tubes which are arranged in U-shape formation.

Another object is to so construct my invention that it will include but one glass tube which can be easily replaced if the same should happen to be broken.

A further object is to so construct my improved gage that the glass tube will be so positioned that it will be protected on all sides so that the possibility of breaking the tube will be reduced to a minimum.

A still further object is to make my invention of a simple and durable construction and so that it will accurately register pressure or partial vacuum existing in various places where it may be employed.

These objects, and other advantageous ends which will be described hereinafter, I attain in the following manner, reference being had to the accompanying drawings in which—

Figure 1 is a front elevation of my improved gage,

Fig. 2 is a central sectional elevation taken in the same plane as viewed from Fig. 1, Fig. 3 is a side elevation of Fig. 1, Fig. 4 is an elevation of a regulating rod which I preferably employ, Fig. 5 is an enlarged transverse section taken on the line 5—5 of Fig. 1, and Fig. 6 is an enlarged fragmentary vertical section showing more clearly certain of the parts illustrated in Fig. 2.

Referring to the drawings, 7 represents a metallic pipe which is screw threaded at 8 at its lower end for attachment to a main line pipe or tank, the internal pressure of which it is necessary to determine throughout various stages in the operation of the manufacture of gas or other material. This pipe 7 extends vertically and has an elbow 9 at its upper end to which is connected a short length of pipe 10, said pipe also being connected to a T-fitting 11, said fitting 11 being secured to the upper end of a second metallic pipe 12 which is parallel with the pipe 7. The lower end of the pipe 12 is secured to an elbow 13, which in turn is connected to a nipple 14 on a base fitting 15. The base fitting 15 has an upwardly extending stem 16 which is externally screw threaded to provide a mounting for a nut 17, said nut having a chamber 18 which is filled with a packing material adapted, when the nut 17 is screwed down upon the stem 16, to force the packing into engagement with a transparent glass tube 19, said glass tube fitting within the nut 17 and preferably resting upon a shoulder 20 formed in said base fitting 15. The glass tube 19 extends vertically between and parallel with the pipes 7 and 12; the upper end of said glass tube being open, as clearly shown in Fig. 2.

A clamping bracket 21 is made in two sections 22 and 23. The sections have portions which embrace the pipes 7 and 12 and the glass tube 19, as clearly shown in Fig. 5. Clamping screws 24 extend through the sections 22 and 23 and serve to bind the sections 22 and 23 together and to said pipes and tube. The glass tube 19 is preferably provided with a resilient band 25, such for example as rubber, and the sections 22 and 23 directly engage this band. In this manner, the pipes and tube are secured together within their lengths and a support is provided for the upper portion of the glass tube 19.

Strips or boards 26 and 27 are clamped together by screws 28 and 29 at opposite sides of the pipe 7 and glass tube 19, said screws also serving to bind said strips to the clamping bracket 21 and to the elbow 9 and nut 17 so that the strips are supported in a position to permit a portion of the glass tube to be visible adjacent one edge of the strips looking from either side. Either or both of the strips 26 and 27 are graduated as shown in Fig. 1, said graduations being numbered from a zero point upwardly and downwardly. For example the graduations are spaced at one-half inch apart, but in view of the U-shape construction between the pipe 12 and tube 19, these one-half inch graduations will actually represent one inch of pressure or partial vacuum; the pressure being indicated above the zero marking while the partial vacuum is indicated by the graduations below the zero marking. By this construction, it is possible to determine either existing pressure or partial vacuum by reading on a single scale.

The T-fitting 11 has a valve 30 connected thereto at its top and this valve can be used for regulating purposes and can be removed to permit the insertion of a regulating rod 31 within the pipe 12. By the use of this regulating rod 31, the gage can be adjusted in order to compensate for any difference in internal diameter between the pipe 12 and the glass tube 19. For example, considering that the internal diameter of the pipe 12 is greater than the internal diameter of the tube 19, the regulating rod 31 can be inserted within the pipe 12 to compensate for the difference in volume between the pipe 12 and the tube 19. If it is found that the rod 31 is too large, the same can be cut off and reinserted and this can be continued until the volume of the pipe 12 is similar to that of the tube 19, and the rod 31 will remain in the device during the operation thereof. The rod 31 can be made of glass or other material preferably of a character which can be cut or broken.

The base fitting 15 has a cap screw 32 connected thereto in alinement with the glass tube 19 so that said tube can be readily cleaned by removing the cap screw and inserting a swab or other cleaning tool (not illustrated) within the tube through the opening provided for the cap screw 32.

In a device made in accordance with my invention, the tube 19 is protected at the sides by the pipes 7 and 12 which are made of metal. In addition to this, it is protected in the front and the back by the strips 26 and 27. It will of course be understood that liquid, such as water is inserted so that the level of said liquid can be read upon the graduated scale as above described.

The glass tube can be easily removed by loosening the nut 17 and withdrawing it out of the base fitting 15. However, when the tube 19 is in place, the packing within the nut 17 will serve to form a tight seal to prevent any of the liquid from leaking out between the nut 17 and tube 19.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A gage including two metallic pipes connected to communicate with each other at their tops; and a glass gage tube interposed between said pipes and detachably connected at its bottom with one of said pipes; substantially as described.

2. A gage including two metallic pipes connected at their tops; a base fitting secured to the bottom of one of said pipes; a glass gage tube entering said base fitting and being positioned between said pipes; and a removable cap screw in said base fitting in alinement with said glass tube; substantially as described.

In testimony whereof I have signed my name to this specification in the presence of two subscribing witnesses.

ASA T. PARKER.

Witnesses:
ANNA RENTON,
CHAS. E. POTTS.